(12) United States Patent
Yoshino et al.

(10) Patent No.: US 9,890,285 B2
(45) Date of Patent: Feb. 13, 2018

(54) ASPHALT-URETHANE COMPOSITION

(71) Applicant: DYFLEX CORPORATION, Shinjuku-ku, Tokyo (JP)

(72) Inventors: Kenji Yoshino, Tokyo (JP); Yoichi Kai, Tokyo (JP)

(73) Assignee: DYFLEX CORPORATION, Tokyo (JP)

( * ) Notice: Subject to any disclaimer, the term of this patent is extended or adjusted under 35 U.S.C. 154(b) by 151 days.

(21) Appl. No.: 14/891,527

(22) PCT Filed: May 23, 2014

(86) PCT No.: PCT/JP2014/063742
§ 371 (c)(1),
(2) Date: Nov. 16, 2015

(87) PCT Pub. No.: WO2014/189141
PCT Pub. Date: Nov. 27, 2014

(65) Prior Publication Data
US 2016/0083585 A1  Mar. 24, 2016

(30) Foreign Application Priority Data

May 24, 2013 (JP) .................. 2013-110288

(51) Int. Cl.
| C08L 95/00 | (2006.01) |
| C08G 18/10 | (2006.01) |
| C09D 175/04 | (2006.01) |
| C08G 18/64 | (2006.01) |
| C08G 18/69 | (2006.01) |
| C08G 18/76 | (2006.01) |
| C08L 75/04 | (2006.01) |

(52) U.S. Cl.
CPC ............. *C08L 95/00* (2013.01); *C08G 18/10* (2013.01); *C08G 18/6476* (2013.01); *C08G 18/69* (2013.01); *C08G 18/7671* (2013.01); *C08L 75/04* (2013.01); *C09D 175/04* (2013.01)

(58) Field of Classification Search
None
See application file for complete search history.

(56) References Cited

U.S. PATENT DOCUMENTS

| 2008/0182925 A1 | 7/2008 | Wang et al. |
| 2012/0031541 A1* | 2/2012 | Smith .................... C08G 18/10 156/71 |
| 2013/0090428 A1 | 4/2013 | Tanihara et al. |

FOREIGN PATENT DOCUMENTS

| CN | 103102706 A | 5/2013 |
| JP | 1-275617 A | 11/1989 |
| JP | 4-213367 A | 8/1992 |
| JP | 4-292683 A | 10/1992 |
| JP | 6-298896 A | 10/1994 |
| JP | 11-240932 A | 9/1999 |
| JP | 2001-72862 A | 3/2001 |
| JP | 2001-329042 A | 11/2001 |
| JP | 2002-173909 A | 6/2002 |
| JP | 2003-313538 A | 11/2003 |
| JP | 2011-80018 A | 4/2011 |
| WO | WO 2013/163799 A1 | 11/2013 |

OTHER PUBLICATIONS

The extended European Search Report dated Oct. 7, 2016, in corresponding European Patent Office Application No. 14801664. 5-1302. (5 pgs).
Office Action (Examination Report No. 1 for Standard Patent Application) dated Mar. 31, 2017, by the Australian Patent Office in corresponding Australian Patent Application No. 2014269390. (3 pages).
Notification of Transmittal of Translation of the International Preliminary Report on Patentability (Forms PCT/IB/338 and PCT/IB/373) and the Written Opinion of the International Searching Authority (Form PCT/ISA/237) dated Dec. 3, 2015, by the International Bureau of WIPO in corresponding International Application No. PCT/JP2014/063742. (7 pgs).
International Search Report (PCT/ISA/210) dated Jul. 22, 2014, by the Japanese Patent Office as the International Searching Authority for International Application No. PCT/JP2014/063742.
International Search Report (PCT/ISA/210) dated Aug. 19, 2014, by the Japanese Patent Office as the International Searching Authority for International Application No. PCT/JP2014/063741.
Notification of Transmittal of Translation of the International Preliminary Report on Patentability (Forms PCT/IB/338 and PCT/IB/373) and the Written Opinion of the International Searching Authority (Form PCT/ISA/237) dated Dec. 3, 2015, by the International Bureau of WIPO in corresponding International Application No. PCT/JP2014/063741. (6 pages).

(Continued)

*Primary Examiner* — Christopher M Rodd
(74) *Attorney, Agent, or Firm* — Oliff PLC

(57) ABSTRACT

An asphalt-urethane composition is disclosed which does not contain any of specific chemical substances, has adhesiveness to mineral-surfaced asphalt roofing and an asphalt groundwork, exhibits performance in temporary waterproofing with respect to the asphalt groundwork, performs adhesion of sand to the surface layer of the mineral-surfaced asphalt roofing and adjustment of irregularity, has adhesiveness of integrating with a urethane waterproof layer applied thereon, has excellent workability, construction efficiency, water resistance, and hot water resistance, has high strength and elasticity, has low temperature sensitivity, and has excellent finish properties. The asphalt-urethane composition can contain at least a component (A) obtained by adding an MDI prepolymer generated by reacting polyolefin polyol having two or more hydroxyl groups, short-chain polyhydric alcohol, and a monomer of MDI, a monomer of MDI, and a solvent a; and a component (B) including asphalt, a catalyst, and a solvent b.

20 Claims, 2 Drawing Sheets

(56) References Cited

OTHER PUBLICATIONS

"JASS 8 Waterproofing and Sealing," Japanese Architectural Standard Specification, (2008), and an English Translation. (11 pages).
"Coating Film Waterproof Material for Architecture," JIS A 6021, (2000), and an English Translation. (27 pages).
'Public Building Construction Standard Specification,' building Construction Edition 9, (2007), and an English Translation. (19 pages).

* cited by examiner

ASPHALT-URETHANE COMPOSITION

TECHNICAL FIELD

The present invention relates to an asphalt-urethane composition and particularly relates to an asphalt-urethane composition suitable for forming a coating film.

Priority is claimed on Japanese Patent Application No. 2013-110288, filed on May 24, 2013, the content of which is incorporated herein by reference.

BACKGROUND ART

As examples of natural asphalt being used for the purpose of waterproofing or adhesion, it is known that asphalt was used for construction of the Tower of Babel in the Book of Genesis of the Old Testament in 3000 BC, more than 5000 years ago. Further, asphalt has a long history in Japan to the extent that the origin of asphalt is shown in the Chronicles of Japan and it can be said that such a long history represents the reliability of asphalt waterproofing. A natural asphalt product imported from the United States which is applied to a flat roof of an entrance eaves portion of an Osaka gas second-generation office building established in 1905 is the first product in which a waterproof layer was constructed on a roof of a building in Japan.

Because of the long history, with modernization, asphalt waterproofing said to be representative of waterproofing has been frequently used along with construction in a reinforced concrete structure in which a building with a flat roof is constructed centering on a public building. In accordance with this, materials used for construction methods or roofing have been established. Asphalt waterproofing has been used since ancient times, but is the most reliable waterproof material even in modern times. At the time of construction, asphalt melted at approximately 260° C. is used as an adhesive to be integrated with roofing, and a plurality of layers of the resultant are laminated with each other, thereby forming a waterproof layer.

After the asphalt waterproof is formed, cinder concrete and pressing concrete are poured on flat ground together with an expansion joint, and bricks or blocks are accumulated in a rising portion and then the surface thereof is finally made flat with mortar. Thereafter, the flat ground is finished with pressing concrete without using cinder concrete and a dry protection finishing material is disposed in the rising portion to protect the waterproof layer.

Further, in a building which does not use a rooftop (people do not access), after the asphalt waterproof is formed, gravel whose diameter is several centimeters is pressed to pave the building in place of concrete and then the building is coated with a coating material (top coat) for finishing to be finished using roofing in which gravel whose diameter is several millimeters is attached for a surface layer.

A method of pouring pressing concrete on a waterproof layer is classified as a protection method and a method of exposing a waterproof layer is classified as an exposure method.

Since an asphalt waterproof layer is protected by concrete in the protection method, a temperature rise in summer is reduced. Volatilization of a low fraction of asphalt at a high temperature into the air is caused by deterioration of asphalt, but deterioration of asphalt is unlikely to proceed because the volatilization is largely prevented.

In addition, since the temperature becomes high because of direct solar radiation in summer and the temperature of the surface of the waterproof layer is increased, a low fraction of asphalt is easily volatilized into the air. In this manner, when asphalt becomes hard and followability with respect to movement of roofing is lowered, the asphalt is contracted and easily deteriorated.

Since the durability of a waterproof layer is 10 to 20 years, but the service life of a building having a reinforced concrete structure is several tens of years, renovation or repair of a waterproof layer is performed with respect to a building.

In regard to the protection method of asphalt waterproofing, construction is normally performed on pressing asphalt poured on a waterproof layer when renovation or repair of a waterproof layer is performed.

At this time, water contained in pressing concrete interposed between an asphalt waterproof layer and a waterproof layer which is newly provided is evaporated at a high temperature (in summer) and causes blistering of the new waterproof layer. In order to prevent the blistering, generally, a ventilation layer that distributes water vapor in a lower layer of the new waterproof layer is normally provided and a deaerating cylinder (vent) that discharges water vapor is provided.

In renovating or repairing the asphalt waterproof layer according to the protection method, a groundwork or a frame of a facility is laid on the pressing concrete in many cases and thus the structure becomes complicated. For this reason, a urethane coating film waterproof exposure method which can obtain a waterproof layer with high durability through coating is frequently used.

In renovating or repairing the asphalt waterproof layer according to the exposure method, the groundwork becomes mineral-surfaced asphalt roofing and a finishing coating material. In a case where an asphalt waterproof layer constructed by the exposure method is removed from the end portion of a rising portion or the like, the groundwork enters a state in which residues of asphalt primer or asphalt compounds remain. Further, in a case where an asphalt waterproof layer constructed by the exposure method is removed, there is a high risk of causing water leakage downstairs due to sudden rainfall when a waterproof treatment is not promptly performed.

When the urethane coating film waterproof is directly constructed with respect to the groundwork, adhesiveness cannot be obtained. In a case where a solvent-based urethane primer is used for construction in order to obtain adhesiveness, asphalt is cut back. The asphalt content migrates to a urethane coating film waterproof layer constructed thereon to cause discoloration of the urethane coating film waterproof layer and the asphalt content migrates to accelerate deterioration of a top coat. For this reason, a coating film-adjusting material has been desired which can be directly applied to an asphalt groundwork, has adhesiveness with respect to asphalt, can allow a portion from which an exposed asphalt waterproof layer is removed to exhibit performance of temporary waterproofing with respect to rainfall after the removing process, performs adhesion of sand to the surface layer of the mineral-surfaced asphalt roofing and adjustment of irregularity, and has adhesiveness integrating with a urethane waterproof layer constructed thereon.

CITATION LIST

Patent Literature

[NPL 1] JIS A 6021 "Coating Film Waterproof Material for Architecture," 2006

[NPL 2] Building Construction Standard Specification and explanation JASS8, waterproof construction, sixth edition

[NPL 3] Public Building Construction Standard Specification (building construction edition), 2007

SUMMARY OF INVENTION

Technical Problem

The present invention has been made in consideration of the above-described problems, and an object thereof is to provide an asphalt-urethane composition which does not contain any of specific chemical substances, has adhesiveness to mineral-surfaced asphalt roofing, asphalt primer when an asphalt waterproof layer constructed according to an exposure method is removed, and an asphalt groundwork such as a residue of an asphalt compound, exhibits performance of temporary waterproofing with respect to a portion from which the asphalt waterproof layer constructed according to the exposure method is removed, performs adhesion of sand to the surface layer of the mineral-surfaced asphalt roofing and adjustment of irregularity, has adhesiveness integrating with a urethane waterproof layer applied thereon, has excellent workability, construction efficiency, water resistance, and hot water resistance, has high strength and elasticity, has low temperature sensitivity, and has excellent finish properties.

Solution to Problem

According to an aspect of the present invention, an asphalt-urethane composition is provided containing at least: a component (A) which is obtained by adding a diphenylmethane diisocyanate prepolymer generated by reacting polyolefin polyol having two or more hydroxyl groups, short-chain polyhydric alcohol, and a monomer of diphenylmethane diisocyanate, a monomer of diphenylmethane diisocyanate, and a solvent a; and a component (B) which includes asphalt, a catalyst, and a solvent b.

According to another aspect of the present invention, an asphalt-urethane composition is provided containing at least: a component (C) which includes a diphenylmethane diisocyanate prepolymer generated by reacting polyolefin polyol having two or more hydroxyl groups, short-chain polyhydric alcohol, and a monomer of diphenylmethane diisocyanate, a monomer of diphenylmethane diisocyanate, a solvent c, asphalt, and a catalyst.

In the asphalt-urethane composition according to the present invention, it is preferable that the polyolefin polyol having two or more hydroxyl groups be at least one selected from the group consisting of polybutadiene polyol, hydrogenated polybutadiene polyol, polyisoprene polyol, castor oil-based polyol, acrylic polyol, and polytetramethylene ether glycol.

In the asphalt-urethane composition according to the present invention, it is preferable that the polyhydric alcohol be at least one selected from the group consisting of ethylene glycol, dipropylene glycol, 1,3-propanediol, 2-methyl 1,3-propanediol, 1,4-butanediol, 3-methyl 1,5-pentanediol, 1,6-hexanediol, glycerin, and trimethylol propane.

In the asphalt-urethane composition according to the present invention, it is preferable that the diphenylmethane diisocyanate be at least one selected from the group consisting of 2,2'-diphenylmethane diisocyanate, 2,4'-diphenylmethane diisocyanate, and 4,4'-diphenylmethane diisocyanate.

In the asphalt-urethane composition according to the present invention, it is preferable that the 4,4'-diphenylmethane diisocyanate be modified diphenylmethane diisocyanate in a liquid state at room temperature at which a part of an isocyanate group is carbondiimide and/or uretonimine-modified.

In the asphalt-urethane composition according to the present invention, it is preferable that the asphalt be natural asphalt, straight asphalt, blown asphalt, or modified asphalt.

Advantageous Effects of Invention

Since an asphalt-urethane composition of the present invention contains a component (A) and a component (B), or contains a component (C), an asphalt-urethane coating film having a thickness of 0.3 mm to 2.0 mm can be obtained by performing coating using a trowel or a spatula or coating using a roller.

Further, the asphalt-urethane composition of the present invention can be integrated with an asphalt groundwork by being directly applied to the asphalt groundwork.

DESCRIPTION OF EMBODIMENTS

Figure 1:
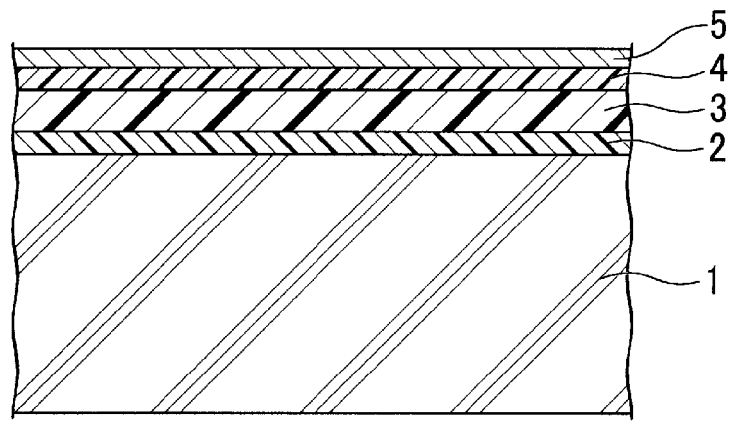
FIG. 1 is a cross-sectional view schematically illustrating a floor surface of an exposed asphalt waterproof concrete roof which is waterproof-coated with an asphalt-urethane composition of the present invention.

Embodiments of an asphalt-urethane composition of the present invention will be described. Further, the present embodiment will be described in detail for convenience of understanding the scope of the invention and is not intended to limit the present invention unless otherwise noted.

[Asphalt-urethane Composition]

(1) First Embodiment

An asphalt-urethane composition of the present embodiment contains at least a component (A) which is obtained by adding a diphenylmethane diisocyanate prepolymer generated by reacting polyolefin polyol having two or more hydroxyl groups, short-chain polyhydric alcohol, and a monomer of diphenylmethane diisocyanate, a monomer of diphenylmethane diisocyanate, and a solvent a; and a component (B) which includes asphalt, a catalyst, and a solvent b.

[Component (A)]

Examples of the polyolefin polyol having two or more hydroxyl groups include polybutadiene polyol, hydrogenated polybutadiene polyol, polyisoprene polyol, and castor oil-based polyol. Among these, polybutadiene polyol is preferable in that the SP value thereof is close to that of asphalt and a large amount of asphalt can be mixed.

Preferred examples of polybutadiene polyol include R-15HT, R-45HT, and KRASOL (manufactured by Idemitsu Kosan Co., Ltd.), and G-1000, R-2000, and G-3000 (manufactured by NIPPON SODA CO., LTD.). Among these, a product whose SP (solubility parameter) value is small is more preferable because of excellent compatibility with asphalt, which is the main component of the component (B).

Examples of diphenylmethane diisocyanate (hereinafter, abbreviated as "MDI") include 2,2'-diphenylmethane diisocyanate, 2,4'-diphenylmethane diisocyanate, and 4,4'-diphenylmethane diisocyanate.

Examples of 4,4'-diphenylmethane diisocyanate include modified diphenylmethane diisocyanate in a liquid state at room temperature at which a part of an isocyanate group is carbondiimide and/or uretonimine-modified.

As polymethylene polyphenyl polyisocyanate (polymeric MDI), a mixture of monomeric MDI and high molecular weight polyisocyanate is exemplified, but diphenylmethane diisocyanate (monomeric MDI) is preferable and 4,4'-diphenylmethane diisocyanate is more preferable.

As the short-chain polyhydric alcohol, at least one selected from the group consisting of ethylene glycol, dipropylene glycol, 1,3-propanediol, 2-methyl 1,3-propanediol, 1,4-butanediol, 3-methyl 1,5-pentanediol, 1,6-hexanediol, glycerin, and trimethylol propane is preferable.

The blending ratio of polyolefin polyol having two or more hydroxyl groups, short-chain polyhydric alcohol, and MDI which constitute MDI prepolymer is preferably in the range of 1.8 to 4.0 and more preferably in the range of 2.7 to 3.3 in terms of the molar equivalent ratio (NCO/OH) of an isocyanate group (NCO group) of MDI to a hydroxyl group (OH group) of polyolefin polyol.

When the above-described molar equivalent ratio (NCO/OH) is less than 1.8, curing of the asphalt-urethane composition becomes slow and the strength of physical properties of a cured material becomes low. Meanwhile, when the above-described molar equivalent ratio (NCO/OH) exceeds 4.0, the strength of physical properties of the cured material becomes high, but the cured material is easily foamed when the asphalt urethane composition is cured at a high temperature.

When the above-described molar equivalent ratio (NCO/OH) is 2.7, the molar equivalent ratio of an isocyanate group (NCO group) of an MDI prepolymer to an isocyanate group (NCO group) of an MDI monomer becomes 1.0:0.7. Further, when the above-described molar equivalent ratio (NCO/OH) is 3.3, the molar equivalent ratio of the MDI prepolymer to the MDI monomer becomes 1.0:1.3.

It is considered that the reason the molar equivalent ratio of the MDI prepolymer to the MDI monomer in the range of 1.0:1.0±0.3 is preferable is that the component (B), the moisture in the air, and the monomer of MDI whose molecular weight is small and has high reactivity are firstly reacted and aminated and the monomer of aminated MDI and the MDI prepolymer are reacted to be polymerized.

In order to generate the MDI prepolymer, polyolefin polyol having two or more hydroxyl groups, short-chain polyhydric alcohol, and a monomer of MDI are mixed at the above-described blending ratio, heated while the mixture in a liquid state is stirred, and then reacted.

The temperature of heating the mixture in a liquid state is preferably in the range of 70° C. to 80° C. and more preferably in the range of 73° C. to 77° C.

Moreover, the time (reaction time) for heating the mixture in a liquid state is preferably in the range of 1.0 hour to 3.0 hours and more preferably in the range of 1.5 hours to 2.0 hours.

Further, since the polyolefin polyol has a double bond in a molecule, an appropriate amount of polymerization inhibitor and antioxidant may be added when the polyolefin polyol and the monomer of MDI are reacted.

Since the MDI prepolymer generated by the above-described reaction has a high viscosity, the MDI prepolymer is low in fluidity at room temperature and is not suitable for work in the field. For this reason, it is necessary that the solvent a be added to the component (A) to be diluted and properties such as the viscosity of the component (A) be adjusted.

The solvent a can be added after the reaction in which the MDI prepolymer is generated is finished, but it is preferable that some or all of the solvent a be added in advance at the time of the reaction of polyolefin polyol having two or more hydroxyl groups, short-chain polyhydric alcohol, and a monomer of MDI and an MDI prepolymer and a monomer of MDI be reacted under the above-described conditions while the solvent is circulated using a cooling condenser from the viewpoints of low viscosity and high stirring efficiency.

The obtained MDI prepolymer contains 84.5% by mass to 93.3% by mass of a urethane prepolymer obtained by adding MDI to polyolefin polyol from which the solvent a is removed and contains 2.3% by mass to 7.3% by mass of an isocyanate group.

The solvent a is not particularly limited as long as the solvent is not reacted with an MDI prepolymer and a monomer of MDI and dissolves the MDI prepolymer and the monomer of MDI, and examples thereof include toluene, xylene, methyl acetate, ethyl acetate, butyl acetate, and mineral spirit.

The blending ratio of the MDI prepolymer to the solvent a is preferably in the range of 75:25 to 35:65 and more preferably in the range of 60:40 to 40:60.

Further, a moisture latent curing agent may be added to the component (A).

Examples of the moisture latent curing agent include aldimine and oxazolidine. Among moisture latent curing agents, Incozol IV (manufactured by Sika Ltd.) is particularly preferable from the viewpoints of high reactivity, less odor at the time of a reaction, and high physical properties of an obtained cured material.

The amount of the moisture latent curing agent to be added is preferably 0 equivalents to 5.0 equivalents of the isocyanate equivalent of the component (A) and more preferably 0.5 equivalents to 2.0 equivalents thereof.

In a case where the amount of the moisture latent curing agent to be added is 0 equivalents of the isocyanate equivalent of the component (A), the moisture latent curing agent becomes a complete moisture curing type agent and can obtain high physical properties, but the cured material of the asphalt-urethane composition is easily foamed due to carbon dioxide ($CO_2$) generated at the time when isocyanate is reacted with moisture.

Further, particularly, in a case where the moisture latent curing agent is used for applications in which the problem of foaming is concerned, it is preferable that the amount of the moisture latent curing agent to be added be 1.0 equivalent to 2.0 equivalents of the isocyanate equivalent of the component (A).

When the amount of the moisture latent curing agent to be added exceeds 1.0 equivalent of the isocyanate equivalent of the component (A), foaming of the cured material of the asphalt-urethane composition does not occur and the physical properties thereof are slightly degraded. However, since the terminal of the cured material is not an isocyanate group but an amino group or a hydroxyl group and the reaction with moisture in the air does not occur, the cured material is not affected by curing days or rainfall and adhesion to a urethane waterproof layer to be constructed thereon can be secured.

The component (A) is prepared by mixing the MDI prepolymer (adding an appropriate amount of polymerization inhibitor and antioxidant in some cases) and the solvent a by the addition amount described above and stirring the mixture in a liquid state.

[Component (B)]

Examples of the asphalt include natural asphalt; straight asphalt formed of vacuum residual oil fractionated from a vacuum distillation device; blown asphalt whose softening point is raised by blowing air at a high temperature to straight asphalt; and modified asphalt whose characteristics are improved by adding additives such as rubber (styrene-butadiene rubber, chloroprene rubber, or natural rubber), a thermoplastic elastomer (a styrene-isobutylene-styrene block copolymer, a styrene-butadiene block copolymer, or a styrene-ethylene-butene copolymer), a thermoplastic resin (ethylene, a vinyl acetate copolymer, an ethylene-ethyl acrylate copolymer, polyethylene, or polypropylene), or a tackifying resin (a rosin resin, a terpene resin, or a petroleum resin) to the natural asphalt, the straight asphalt, or the blown asphalt.

In the blending amount of the asphalt in the component (B), the amount of the solvent b for liquefying the asphalt at room temperature is appropriately adjusted according to the kind of the asphalt.

In a case where straight asphalt with a low penetration degree, which is defined in Japanese Industrial Standard JIS K2207 (petroleum asphalt) and K2235 (petroleum wax), is used, the blending ratio of the asphalt to the solvent b is approximately 8:2. Further, in a case where blown asphalt is used, the blending ratio of the asphalt to the solvent b is approximately 7:3. Further, the ratio of the solvent b becomes large in modified asphalt.

As the solvent b, a solvent which is the same as the solvent a used for the above-described component (A) is used.

Further, water, low-molecular-weight polyhydric alcohol, or both of water and low-molecular-weight polyhydric alcohol may be added to the component (B) as a crosslinking agent.

The amount of water or low-molecular-weight polyhydric alcohol to be added is preferably in the range of 0 equivalents to 5.0 equivalents and more preferably in the range of 0.5 equivalents to 2.0 equivalents with respect to the isocyanate equivalent of the component (A).

Moreover, particularly, in the case where the component (B) is used for applications in which the problem of foaming is concerned, the amount of the moisture latent curing agent to be added is preferably in the range of 1.0 equivalent to 2.0 equivalents of the isocyanate equivalent of the component (A).

In a case where the amount of water to be added is 0 equivalents with respect to the isocyanate equivalent of the component (A), curing of only the surface in contact with the air advances. In addition, in a case where the surface is thickly coated, it takes time for the inside thereof to be cured. Further, when the amount of water to be added exceeds 1.0 equivalents with respect to the isocyanate equivalent of the component (A), an amino group or a hydroxyl group generated due to the reaction with isocyanate becomes excessive and physical properties of the coating film after curing are degraded.

Further, when the amount of low-molecular-weight polyhydric alcohol of water to be added exceeds 1.0 equivalent with respect to the isocyanate equivalent of the component (A), the hydroxyl groups which cannot be reacted with isocyanate are increased and the physical properties are degraded. Moreover, since the terminal of the cured material is not an isocyanate group but an amino group or a hydroxyl group and the reaction with moisture in the air does not occur, the cured material is not affected by curing days or rainfall and a layer adhered to a urethane waterproof layer to be constructed thereon can be secured.

Moreover, as the low-molecular-weight polyhydric alcohol of a crosslinking agent, which is added to the component (B), divalent alcohol such as ethylene glycol, diethylene glycol, 1,3-propanediol, 1,4-butanediol, or 1,5-pentanediol and trivalent alcohol such as glycerin or trimethylol propane are used.

Examples of a catalyst include a metal catalyst and an amine catalyst.

The component (B) is prepared by heating and stirring asphalt in a nitrogen atmosphere, mixing a solvent b with the asphalt to be liquefied, adding a catalyst thereto, and then cooling the mixture. Moreover, water may be also added thereto when the catalyst is added.

The temperature of heating the mixture is preferably in the range of 60° C. to 100° C. and more preferably in the range of 60° C. to 80° C.

Further, in order to prevent volatilization of the solvent b, the time (reaction time) for heating the mixture is preferably short and more preferably in the range of 0.15 hours to 0.3 hours.

[Asphalt-urethane Composition]

The asphalt-urethane composition is prepared by adding the component (B) to the component (A) and stirring and mixing the mixture at room temperature.

The blending ratio of the component (A) to the component (B) is preferably in the range of 1.0:1.0 to 1.0:10.0 and more preferably in the range of 1.0:1.0 to 1.0:5.0.

The asphalt-urethane composition of the present invention is obtained by mixing the component (A) with the component (B) and stirring the mixture. An asphalt-urethane coating film having a thickness of 0.3 mm to 2.0 mm can be obtained by performing coating using a trowel or a spatula or coating using a roller.

Further, the asphalt-urethane composition of the present invention can be integrated with an asphalt groundwork by being directly applied to the asphalt groundwork. For this reason, an asphalt-urethane composition can be directly applied to an asphalt groundwork, has adhesion force with respect to asphalt, can allow a portion from which an asphalt waterproof layer is removed to exhibit performance of temporary waterproofing, performs adhesion of sand to the surface layer of the mineral-surfaced asphalt roofing and adjustment of irregularity, and can be integrated with a urethane waterproof layer constructed thereon.

Further, the asphalt-urethane composition of the present invention can be also bonded to the urethane coating film waterproof material to allow them to be integrated with each other.

Moreover, asphalt and the asphalt-urethane composition of the present invention can be integrated with each other by laminating heated and melted asphalt on the asphalt-urethane composition of the present invention. Accordingly, durability which cannot be obtained by waterproofing exposed parking lots can be secured by coating a rooftop parking lot or the like, with the urethane coating film of the present invention, that is waterproof-processed using a urethane coating film waterproof layer and forming asphalt pavement.

Further, since the asphalt-urethane composition of the present invention does not contain any of specific chemical substances in the Occupational Safety and Health Act, an impact on workers' health while handling the asphalt-urethane composition in manufacturing processes or civil engineering and construction sites is reduced.

(2) Second Embodiment

An asphalt-urethane composition of the present embodiment contains at least a component (C) which includes a diphenylmethane diisocyanate prepolymer generated by reacting polyolefin polyol having two or more hydroxyl groups, short-chain polyhydric alcohol, and a monomer of diphenylmethane diisocyanate, a monomer of diphenylmethane diisocyanate, a solvent c, asphalt, and a catalyst.

As polyolefin polyol having two or more hydroxyl groups, short-chain polyhydric alcohol, a monomer of diphenylmethane diisocyanate, a diphenylmethane diisocyanate prepolymer, asphalt, and a catalyst which are the same as those of the first embodiment described above are used.

A solvent c which is the same as the solvent a of the first embodiment described above is used.

The blending ratio of the MDI prepolymer to the monomer of MDI is the same as that of the first embodiment described above.

In the blending amount of the asphalt in the component (C), the amount of the solvent c for liquefying the asphalt at room temperature is appropriately adjusted according to the kind of the asphalt.

In a case where straight asphalt with a low penetration degree, which is defined in Japanese Industrial Standard JIS K2207 (petroleum asphalt) and K2235 (petroleum wax), is used, the blending ratio of the asphalt to the solvent c is approximately 8:2. Further, in a case where blown asphalt is used, the blending ratio of the asphalt to the solvent c is approximately 7:3.

A moisture latent curing agent may be added to the component (C) if necessary.

The component (C) is prepared by heating and stirring asphalt in a nitrogen atmosphere, mixing a solvent c and an MDI prepolymer (adding an appropriate amount of polymerization inhibitor and antioxidant in some cases) with the asphalt to be liquefied, adding a catalyst thereto, and then cooling the mixture.

The temperature of heating the mixture is preferably in the range of 60° C. to 100° C. and more preferably in the range of 60° C. to 80° C.

Further, in order to prevent volatilization of the solvent c, the time (reaction time) for heating the mixture is preferably short and more preferably in the range of 0.15 hours to 0.3 hours.

[Asphalt-urethane Composition]

Since the asphalt-urethane composition of the present invention contains the component (C), the same effects as those of the first embodiment can be obtained.

[Usage Example of Asphalt-urethane Composition]

Next, a usage example of the asphalt-urethane composition of the present invention will be described.

FIG. 1 is a cross-sectional view schematically illustrating a roof of an existing exposed asphalt waterproof layer which is waterproof-coated with the asphalt-urethane composition of the present invention.

In FIG. 1, the reference numeral 1 indicates concrete of a roof portion, the reference numeral 2 indicates an exposed asphalt waterproof layer, the reference numeral 3 indicates an asphalt-urethane composition, the reference numeral 4 indicates a urethane waterproof layer, and the reference numeral 5 indicates a top coat.

In the roof illustrated in FIG. 1, the urethane waterproof layer is formed by coating the surface of the concrete 1 of a roof portion with the asphalt-urethane composition of the present invention through the exposed asphalt waterproof layer 2 and curing the coating film.

Figure 2:
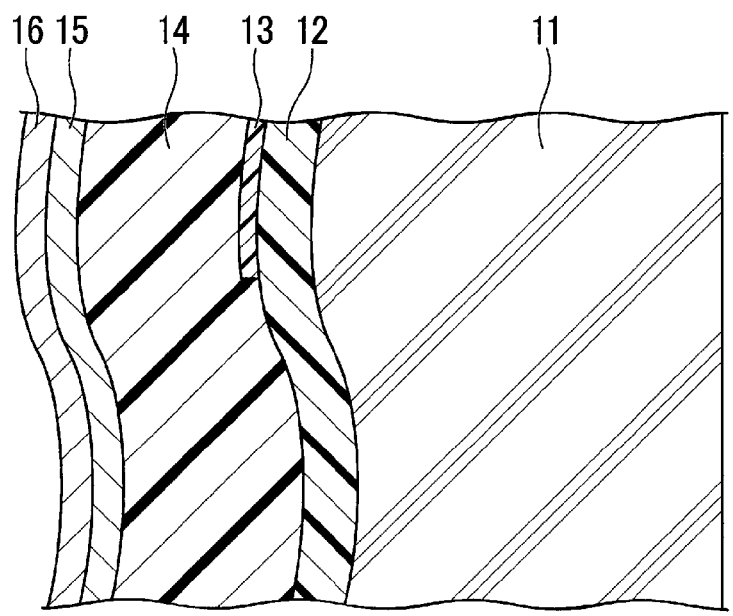
FIG. 2 is a cross-sectional view schematically illustrating a rising surface of a concrete roof from which an exposed asphalt waterproof layer which is waterproof-coated with the asphalt-urethane composition of the present invention is removed.

FIG. 2 is a cross-sectional view schematically illustrating a roof from which an exposed asphalt waterproof layer is removed in the existing exposed asphalt waterproof layer which is waterproof-coated with the asphalt-urethane composition of the present invention.

In FIG. 2, the reference numeral 11 indicates concrete of a roof portion, the reference numeral 12 indicates asphalt primer, the reference numeral 13 indicates a partially remaining asphalt compound, the reference numeral 14 indicates an asphalt-urethane composition, the reference numeral 15 indicates a urethane waterproof layer, and the reference number 16 indicates a top coat.

In the roof illustrated in FIG. 2, the urethane waterproof layer is formed by coating the surface of the concrete 11 of a roof portion with the asphalt-urethane composition through the asphalt primer 12 remaining on the surface of the concrete 11 of a roof portion and the remaining asphalt-urethane composition 14 and curing the coating film.

Figure 3:
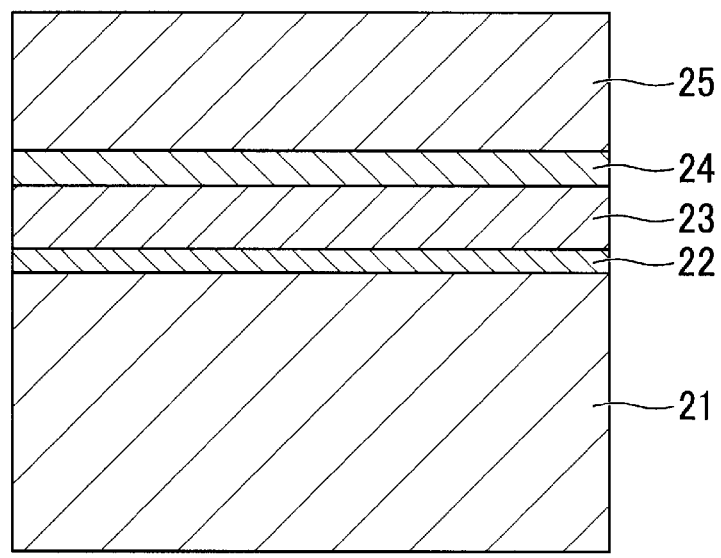
FIG. 3 is a cross-sectional view schematically illustrating a concrete floor slab of a road bridge which is waterproofed using the asphalt-urethane composition of the present invention.

FIG. 3 is a cross-sectional view schematically illustrating a concrete floor slab of a road bridge which is waterproofed using the asphalt-urethane composition of the present invention.

In FIG. 3, the reference numeral 21 indicates a concrete floor slab of a road bridge, the reference numeral 22 indicates primer, the reference numeral 23 indicates a urethane waterproof layer, the reference numeral 24 indicates an asphalt-urethane composition, and the reference numeral 25 indicates an asphalt paving material.

The concrete floor slab of a road bridge illustrated in FIG. 3 is obtained by coating the concrete floor slab 21 of a road bridge with the asphalt-urethane composition 24 of the present invention through the primer 22 and the urethane waterproof layer 23 to obtain a coating film, curing the coating film, and laminating the asphalt paving material 25 thereon.

EXAMPLES

Hereinafter, the present invention will be described in detail with reference to Examples, but the present invention is not limited to Examples below.

Preparation Example 1

Preparation of Component (A-1)

0.2 parts by mass of an antioxidant (trade name: IRGANOX 1035, manufactured by BASF Japan Ltd.), 0.1 parts by mass of a polymerization inhibitor (p-methoxyphenol, manufactured by SHOWA CHEMICAL CO., LTD.), and 50.0 parts by mass of a solvent (toluene, manufactured by Maruzen Petrochemical Co., Ltd.) were added to a mixture obtained by adding 9.8 parts by mass of MDI-LL (trade name: Cosmonate LL, manufactured by Mitsui Chemicals, Inc., NCO %: 29%) to 39.9 parts by mass of polybutadiene polyol (trade name: R-45HT, OH value: 46.6±2, manufactured by Idemitsu Kosan Co., Ltd.) whose number-average equivalent was 1,200 to be mixed with each other in a metal sealed container such that the molar equivalent ratio (NCO/OH) became 2.0, to obtain a mixture in a liquid state, the mixture in a liquid state was stirred in a nitrogen gas atmosphere, the container was sealed, the content was heated in an oven at 40° C. for 3 hours and heated in an oven at 60° C. for 5 hours to be reacted, thereby obtaining a urethane prepolymer (component (A-1)) with fluidity at room temperature (see Table 1).

The urethane prepolymer was obtained by adding diphenylmethane diisocyanate to polybutadiene polyol and contained 99.9% of a polybutadiene polymer, 0.1% of a diphenylmethane diisocyanate monomer, and 1.41% of an isocyanate group.

Preparation Example 2

Preparation of Component (A-2)

0.2 parts by mass of an antioxidant (trade name: IRGANOX 1035, manufactured by BASF Japan Ltd.), 0.1 parts by mass of a polymerization inhibitor (p-methoxyphenol, manufactured by SHOWA CHEMICAL CO., LTD.), and 48.7 parts by mass of a solvent (toluene, manufactured by Maruzen Petrochemical Co., Ltd.) were added to a mixture obtained by adding 9.5 parts by mass of MDI-LL (trade name: Cosmonate LL, manufactured by Mitsui Chemicals, Inc., NCO %: 29%) and 2.6 parts by mass of MDI-LK (trade name: Cosmonate LK, manufactured by Mitsui Chemicals, Inc., NCO %: 28.3%) to 38.9 parts by mass of polybutadiene polyol (trade name: R-45HT, OH value: 46.6±2, manufactured by Idemitsu Kosan Co., Ltd.) whose number-average equivalent was 1,200 in a metal sealed container such that the molar equivalent ratio (NCO/OH) became 2.5, to obtain a mixture in a liquid state, the mixture in a liquid state was stirred in a nitrogen gas atmosphere, the container was sealed, the content was heated in an oven at 40° C. for 3 hours and heated in an oven at 60° C. for 5 hours to be reacted, thereby obtaining a urethane prepolymer (component (A-2)) with fluidity at room temperature (see Table 1).

The urethane prepolymer was obtained by adding diphenylmethane diisocyanate to polybutadiene polyol and contained 96.3% of a polybutadiene polymer, 3.7% of a diphenylmethane diisocyanate monomer, and 2.11% of an isocyanate group.

Preparation Example 3

Preparation of Component (A-3)

0.2 parts by mass of an antioxidant (trade name: IRGANOX 1035, manufactured by BASF Japan Ltd.), 0.1 parts by mass of a polymerization inhibitor (p-methoxyphenol, manufactured by SHOWA CHEMICAL CO., LTD.), and 47.5 parts by mass of a solvent (toluene, manufactured by Maruzen Petrochemical Co., Ltd.) were added to a mixture obtained by adding 9.3 parts by mass of MDI-LL (trade name: Cosmonate LL, manufactured by Mitsui Chemicals, Inc., NCO %: 29%) and 4.9 parts by mass of MDI-LK (trade name: Cosmonate LK, manufactured by Mitsui Chemicals, Inc., NCO %: 28.3%) to 38.0 parts by mass of polybutadiene polyol (trade name: R-45HT, OH value: 46.6±2, manufactured by Idemitsu Kosan Co., Ltd.) whose number-average equivalent was 1,200 in a metal sealed container such that the molar equivalent ratio (NCO/OH) became 3.0, to obtain a mixture in a liquid state, the mixture in a liquid state was stirred in a nitrogen gas atmosphere, the container was sealed, the content was heated in an oven at 40° C. for 3 hours, in an oven at 60° C. for 3 hours, and in an oven at 80° C. for 0.5 hours to be reacted, thereby obtaining a urethane prepolymer (component (A-3)) with fluidity at room temperature (see Table 1).

The urethane prepolymer was obtained by adding diphenylmethane diisocyanate to polybutadiene polyol and contained 92.8% of a polybutadiene polymer, 7.2% of a diphenylmethane diisocyanate monomer, and 2.75% of an isocyanate group.

Preparation Example 4

Preparation of Component (A-4)

0.2 parts by mass of an antioxidant (trade name: IRGANOX 1035, manufactured by BASF Japan Ltd.), 0.1 parts by mass of a polymerization inhibitor (p-methoxyphenol, manufactured by SHOWA CHEMICAL CO., LTD.), and 46.4 parts by mass of a solvent (toluene, manufactured by Maruzen Petrochemical Co., Ltd.) were added to a mixture obtained by adding 9.1 parts by mass of MDI-LL (trade name: Cosmonate LL, manufactured by Mitsui Chemicals, Inc., NCO %: 29%) and 7.1 parts by mass of MDI-LK (trade name: Cosmonate LK, manufactured by Mitsui Chemicals, Inc., NCO %: 28.3%) to 37.1 parts by mass of polybutadiene polyol (trade name: R-45HT, OH value: 46.6±2, manufactured by Idemitsu Kosan Co., Ltd.) whose number-average equivalent was 1,200 in a metal sealed container such that the molar equivalent ratio (NCO/OH) became 3.5, to obtain a mixture in a liquid state, the mixture in a liquid state was stirred in a nitrogen gas atmosphere, the container was sealed, the content was heated in an oven at 40° C. for 3 hours, in an oven at 60° C. for 3 hours, and in an oven at 80° C. for 0.5 hours to be reacted, thereby obtaining a urethane prepolymer (component (A-4)) with fluidity at room temperature (see Table 1).

The urethane prepolymer was obtained by adding diphenylmethane diisocyanate to polybutadiene polyol and contained 89.6% of a polybutadiene polymer, 10.4% of a diphenylmethane diisocyanate monomer, and 3.35% of an isocyanate group.

Preparation Example 5

Preparation of Component (A-5)

0.2 parts by mass of an antioxidant (trade name: IRGANOX 1035, manufactured by BASF Japan Ltd.), 0.1 parts by mass of a polymerization inhibitor (p-methoxyphenol, manufactured by SHOWA CHEMICAL CO., LTD.), and 45.4 parts by mass of a solvent (toluene, manufactured by Maruzen Petrochemical Co., Ltd.) were added to a mixture obtained by adding 8.9 parts by mass of MDI-LL (trade name: Cosmonate LL, manufactured by Mitsui Chemicals, Inc., NCO %: 29%) and 9.2 parts by mass of MDI-LK (trade name: Cosmonate LK, manufactured by Mitsui Chemicals, Inc., NCO %: 28.3%) to 36.2 parts by mass of polybutadiene polyol (trade name: R-45HT, OH value: 46.6±2, manufactured by Idemitsu Kosan Co., Ltd.) whose number-average equivalent was 1,200 in a metal sealed container such that the molar equivalent ratio (NCO/OH) became 4.0, to obtain a mixture in a liquid state, the mixture in a liquid state was stirred in a nitrogen gas atmosphere, the container was sealed, the content was heated in an oven at 40° C. for 3 hours, in an oven at 60° C. for 3 hours, and in an oven at 80° C. for 0.5 hours to be reacted, thereby obtaining a urethane prepolymer (component (A-5)) with fluidity at room temperature (see Table 1).

The urethane prepolymer was obtained by adding diphenylmethane diisocyanate to polybutadiene polyol and contained 86.6% of a polybutadiene polymer, 13.4% of a diphenylmethane diisocyanate monomer, and 3.93% of an isocyanate group.

Preparation Example 6

Preparation of Component (A-6)

A urethane coating film waterproof material for a building in conformity with JIS A 6021 or a two-component type material (trade name: Cosmic PRO12, manufactured by UFLEX CO., LTD.) (component (A-6)) was used as a urethane prepolymer (see Table 1).

The urethane prepolymer contained 3.70% of an isocyanate group.

Preparation Example 7

Preparation of Component (A-7)

A urethane coating film waterproof material for a building in conformity with JIS A 6021 or a one-component type material (trade name: ZERO ONE, manufactured by UFLEX CO., LTD.) (component (A-7)) was used as a urethane prepolymer (see Table 1).

The urethane prepolymer contained 1.00% of an isocyanate group.

Preparation Example 8

Preparation of Component (B-1)

17.1 parts by mass of a solvent (toluene, manufactured by Maruzen Petrochemical Co., Ltd.) and 11.4 parts by mass of a solvent (trade name: xylene, manufactured by Maruzen Petrochemical Co., Ltd.) were added to 70.0 parts by mass of straight asphalt 60-80 (trade name: 60-80 straight asphalt, manufactured by JX Nippon Oil & Energy Corporation) heated and softened at 80° C. in a nitrogen atmosphere while stirring, thereby obtaining liquid asphalt.

The liquid asphalt was cooled to room temperature and 0.8 parts by mass of dibutyl tin dilaurate (trade name: Formate S-9, manufactured by Mitsui Chemicals, Inc.) as a curing catalyst was added thereto, stirred, and then mixed at 2,000 rpm for approximately 10 minutes.

Subsequently, 0.7 parts by mass of a silicon-based antifoaming agent (trade name: AO-5, manufactured by KYOE-ISHA CHEMICAL Co., Ltd.) was added thereto, stirred, and mixed for 10 minutes, thereby preparing a component (B-1) (see Table 2).

Preparation Example 9

Preparation of Component (B-2-1)

A component (B-2-1) was prepared in the same manner as in Preparation Example 8 except that 0.6 parts by mass of water was added (see Table 2).

Preparation Example 10

Preparation of Component (B-2-2)

A component (B-2-2) was prepared in the same manner as in Preparation Example 8 except that 0.3 parts by mass of water was added (see Table 2).

Preparation Example 11

Preparation of Component (B-2-3)

A component (B-2-3) was prepared in the same manner as in Preparation Example 8 except that 0.1 parts by mass of water was added (see Table 2).

TABLE 1

| Adjustment Example | 1 | 2 | 3 | 4 | 5 | 6 | 7 |
|---|---|---|---|---|---|---|---|
| Name of raw material | A-1 | A-2 | A-3 | A-4 | A-5 | A-6 | A-7 |
| R-45HT | 39.9 | 38.9 | 38.0 | 37.1 | 36.2 | 0.0 | 0.0 |
| MDI-LL | 9.8 | 9.5 | 9.3 | 9.1 | 8.9 | 0.0 | 0.0 |
| MDI-LK | 0.0 | 2.6 | 4.9 | 7.1 | 9.2 | 0.0 | 0.0 |
| MQ (p-methoxyphenol) | 0.1 | 0.1 | 0.1 | 0.1 | 0.1 | 0.0 | 0.0 |
| IRGANOX 1035 | 0.2 | 0.2 | 0.2 | 0.2 | 0.2 | 0.0 | 0.0 |
| Toluene | 50.0 | 48.7 | 47.5 | 46.4 | 45.4 | 0.0 | 0.0 |
| Main agent PRO-12 | 0.0 | 0.0 | 0.0 | 0.0 | 0.0 | 100.0 | 0.0 |
| ZERO ONE | 0.0 | 0.0 | 0.0 | 0.0 | 0.0 | 0.0 | 100.0 |
| Total | 100.0 | 100.0 | 100.0 | 100.0 | 100.0 | 100.0 | 100.0 |
| (NCO/OH)INDEX | 2.0 | 2.5 | 3.0 | 3.5 | 4.0 | — | — |
| NCO % | 1.41 | 2.11 | 2.75 | 3.35 | 3.93 | 3.70 | 1.00 |

Preparation Example 12

Preparation of Component (B-3-1)

A component (B-3-1) was prepared in the same manner as in Preparation Example 8 except that 0.3 parts by mass of 1,4-butanediol (1,4-BD, OH value: 1,247, manufactured by Mitsubishi Chemical Corporation) whose number-average molecular weight was 90 was added (see Table 2).

Preparation Example 13

Preparation of Component (B-3-2)

A component (B-3-2) was prepared in the same manner as in Preparation Example 8 except that 1.5 parts by mass of 1,4-butanediol (1,4-BD, OH value: 1,247, manufactured by Mitsubishi Chemical Corporation) whose number-average molecular weight was 90 was added (see Table 2).

Preparation Example 14

Preparation of Component (B-3-3)

A component (B-3-3) was prepared in the same manner as in Preparation Example 8 except that 0.8 parts by mass of 1,4-butanediol (1,4-BD, OH value: 1,247, manufactured by Mitsubishi Chemical Corporation) whose number-average molecular weight was 90 was added (see Table 2).

Preparation Example 15

Preparation of Component (B-4-1)

10.3 parts by mass of a solvent (toluene, manufactured by Maruzen Petrochemical Co., Ltd.), 6.9 parts by mass of a solvent (trade name: xylene, manufactured by Maruzen Petrochemical Co., Ltd.), a urethane coating film waterproof material for a building in conformity with JIS A 6021, and 40.0 parts by mass of a two-component type material (trade name: Cosmic PRO12, manufactured by UFLEX CO., LTD.) were added to 42.0 parts by mass of straight asphalt 60-80 (trade name: 60-80 straight asphalt, manufactured by JX Nippon Oil & Energy Corporation) heated and softened at 80° C. in a nitrogen atmosphere while stirring, thereby obtaining liquid asphalt.

The liquid asphalt was cooled to room temperature and 0.5 parts by mass of dibutyl tin dilaurate (trade name: Formate S-9, manufactured by Mitsui Chemicals, Inc.) as a curing catalyst was added thereto, stirred, and then mixed at 2,000 rpm for approximately 10 minutes.

Subsequently, 0.4 parts by mass of a silicon-based anti-foaming agent (trade name: AO-5, manufactured by KYOEISHA CHEMICAL Co., Ltd.) was added thereto, stirred, and mixed for 10 minutes, thereby preparing a component (B-4-1) (see Table 2).

Preparation Example 16

Preparation of Component (B-4-2)

12.8 parts by mass of a solvent (toluene, manufactured by Maruzen Petrochemical Co., Ltd.), 8.6 parts by mass of a solvent (trade name: xylene, manufactured by Maruzen Petrochemical Co., Ltd.), a urethane coating film waterproof material for a building in conformity with JIS A 6021, and 25.0 parts by mass of a two-component type material (trade name: Cosmic PRO12, manufactured by UFLEX CO., LTD.) were added to 52.5 parts by mass of straight asphalt 60-80 (trade name: 60-80 straight asphalt, manufactured by JX Nippon Oil & Energy Corporation) heated and softened at 80° C. in a nitrogen atmosphere while stirring, thereby obtaining liquid asphalt.

The liquid asphalt was cooled to room temperature and 0.6 parts by mass of dibutyl tin dilaurate (trade name: Formate S-9, manufactured by Mitsui Chemicals, Inc.) as a curing catalyst was added thereto, stirred, and then mixed at 2,000 rpm for approximately 10 minutes.

Subsequently, 0.5 parts by mass of a silicon-based anti-foaming agent (trade name: AO-5, manufactured by KYOEISHA CHEMICAL Co., Ltd.) was added thereto, stirred, and mixed for 10 minutes, thereby preparing a component (B-4-2) (see Table 2).

Preparation Example 17

Preparation of Component (B-4-3)

14.7 parts by mass of a solvent (toluene, manufactured by Maruzen Petrochemical Co., Ltd.), 9.8 parts by mass of a solvent (trade name: xylene, manufactured by Maruzen Petrochemical Co., Ltd.), a urethane coating film waterproof material for a building in conformity with JIS A 6021, and 14.3 parts by mass of a two-component type material (trade name: Cosmic PRO12, manufactured by UFLEX CO., LTD.) were added to 60.0 parts by mass of straight asphalt 60-80 (trade name: 60-80 straight asphalt, manufactured by JX Nippon Oil & Energy Corporation) heated and softened at 80° C. in a nitrogen atmosphere while stirring, thereby obtaining liquid asphalt.

The liquid asphalt was cooled to room temperature and 0.6 parts by mass of dibutyl tin dilaurate (trade name: Formate S-9, manufactured by Mitsui Chemicals, Inc.) as a curing catalyst was added thereto, stirred, and then mixed at 2,000 rpm for approximately 10 minutes.

Subsequently, 0.6 parts by mass of a silicon-based anti-foaming agent (trade name: AO-5, manufactured by KYOEISHA CHEMICAL Co., Ltd.) was added thereto, stirred, and mixed for 10 minutes, thereby preparing a component (B-4-3) (see Table 2).

TABLE 2

| Adjustment Example | 8 | 9 | 10 | 11 | 12 | 13 | 14 | 15 | 16 | 17 |
|---|---|---|---|---|---|---|---|---|---|---|
| Name of raw material | B-1 | B-2-1 | B-2-2 | B-2-3 | B-3-1 | B-3-2 | B-3-3 | B-4-1 | B-4-2 | B-4-3 |
| Straight asphalt 60-80 | 70.0 | 70.0 | 70.0 | 70.0 | 70.0 | 70.0 | 70.0 | 42.0 | 52.5 | 60.0 |
| Toluene | 17.1 | 17.1 | 17.1 | 17.1 | 17.1 | 17.1 | 17.1 | 10.3 | 12.8 | 14.7 |
| Xylene | 11.4 | 11.4 | 11.4 | 11.4 | 11.4 | 11.4 | 11.4 | 6.9 | 8.6 | 9.8 |
| Formate S-9 | 0.8 | 0.8 | 0.8 | 0.8 | 0.8 | 0.8 | 0.8 | 0.5 | 0.6 | 0.6 |
| AO-5 | 0.7 | 0.7 | 0.7 | 0.7 | 0.7 | 0.7 | 0.7 | 0.4 | 0.5 | 0.6 |
| Water | 0.0 | 0.6 | 0.3 | 0.1 | 0.0 | 0.0 | 0.0 | 0.0 | 0.0 | 0.0 |
| 1.4-BD | 0.0 | 0.0 | 0.0 | 0.0 | 3.0 | 1.5 | 0.8 | 0.0 | 0.0 | 0.0 |
| PRO-12 curing agent | 0.0 | 0.0 | 0.0 | 0.0 | 0.0 | 0.0 | 0.0 | 40.0 | 25.0 | 14.3 |
| Total | 100.0 | 100.6 | 100.3 | 100.1 | 103.0 | 101.5 | 100.8 | 100.0 | 100.0 | 100.0 |

[Test for Adhesion to Various Groundworks]

A groundwork assumed when an exposed asphalt waterproof layer was renovated was prepared.

[Groundwork I]

A groundwork plate I was prepared by polishing the surface of an ISO mortar plate (100×200×thickness of 10 mm) prepared in conformity with JIS R 5201 (10.4) using #150 sandpaper. After releasing tape with an adhesive was adhered to a portion spaced apart from an end portion of the groundwork plate I by a distance of 120 mm, a back-up material with an adhesive which had a thickness of 3.0 mm was provided in the periphery of the groundwork plate I.

[Groundwork Plate II]

The groundwork plate I was coated with approximately 0.2 kg/m² of asphalt primer (trade name: SR prime A, manufactured by Shizuoka Rekisei Kougyou Co., Ltd.)

using a brush and was dried for 24 hours, thereby preparing a groundwork plate II. After releasing tape with an adhesive was adhered to a portion spaced apart from an end portion of the groundwork plate II by a distance of 120 mm, a back-up material with an adhesive which had a thickness of 3.0 mm was provided in the periphery of the groundwork plate II.

[Groundwork Plate III]

60 parts by mass of three kinds of asphalt (trade name: FUJI CLEAN, manufactured by Shosekikako Co., Ltd.) for waterproofing construction in JIS K 2207 was heated at 80° C. in a sealed container, 40 parts by mass of toluene (manufactured by Maruzen Petrochemical Co., Ltd.) was gradually added thereto and mixed with the asphalt, and the mixture was heated in an oven at 60° C. for 1.0 hour, stirred, uniformly liquefied, and then cooled to room temperature.

The groundwork plate II was coated with approximately 0.4 kg/m² of a solvent including three kinds of obtained liquid asphalt for waterproofing construction using a brush and was dried for 78 hours, thereby preparing a groundwork plate III. After releasing tape with an adhesive was adhered to a portion spaced apart from an end portion of a groundwork plate b by a distance of 120 mm, a back-up material with an adhesive which had a thickness of 3.0 mm was provided in the periphery of the groundwork plate III.

Example 1

Preparation of Asphalt-urethane Composition 100 parts by mass of the component (B-1) was added to 100 parts by mass of the component (A-1) to be mixed with each other at 1,000 rpm for approximately 3 minutes, thereby preparing an asphalt-urethane composition (A-1:B-1=1:1).

The groundworks I, II, and III were coated with the prepared asphalt-urethane composition (A-1:B-1=1:1) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

[Evaluation]

The asphalt-urethane composition was cured at 23° C. for 168 hours and the cured state was observed. The results thereof are listed in Table 3.

Further, in Table 3, a case where the curing of the asphalt-urethane composition was in a state of a uniform elastomer is indicated as V, a case where the curing thereof was swollen and fine foaming was present on the upper surface thereof is indicated as W, a case where the curing thereof was in a state of a non-uniform elastomer is indicated as X, a case where the curing thereof was divided into an upper layer and a lower layer is indicated as Y, and a case where the curing thereof was not made yet is indicated as Z.

Further, the density and the hardness (type A) of the asphalt-urethane composition after curing at 23° C. were measured. The results are listed in Table 3. In addition, the hardness (type A) was measured using a durometer (spring type rubber hardness meter) in conformity with JIS K 6253.

In the same manner, the asphalt-urethane composition was cured at 60° C. for 168 hours and the cured state was observed. The results thereof are listed in Table 3.

Further, the density and the hardness (type A) of the asphalt-urethane composition after curing at 60° C. were measured. The results are listed in Table 3.

Example 2

Preparation of Asphalt-urethane Composition 200 parts by mass of the component (B-1) was added to 100 parts by mass of the component (A-1) to be mixed with each other at 1,000 rpm for approximately 3 minutes, thereby preparing an asphalt-urethane composition (A-1:B-1=1:2).

The groundworks I, II, and III were coated with the prepared asphalt-urethane composition (A-1:B-1=1:2) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 2 were evaluated in the same manner as in Example 1. The results are listed in Table 3.

Example 3

Preparation of Asphalt-urethane Composition 400 parts by mass of the component (B-1) was added to 100 parts by mass of the component (A-1) to be mixed with each other at 1,000 rpm for approximately 3 minutes, thereby preparing an asphalt-urethane composition (A-1:B-1=1:4).

The groundworks I, II, and III were coated with the prepared asphalt-urethane composition (A-1:B-1=1:4) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 3 were evaluated in the same manner as in Example 1. The results are listed in Table 3.

Example 4

Preparation of Asphalt-urethane Composition 100 parts by mass of the component (B-1) was added to 100 parts by mass of the component (A-2) to be mixed with each other at 1,000 rpm for approximately 3 minutes, thereby preparing an asphalt-urethane composition (A-2:B-1=1:1).

The groundworks I, II, and III were coated with the prepared asphalt-urethane composition (A-2:B-1=1:1) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 4 were evaluated in the same manner as in Example 1. The results are listed in Table 3.

Example 5

Preparation of Asphalt-urethane Composition 200 parts by mass of the component (B-1) was added to 100 parts by mass of the component (A-2) to be mixed with each other at 1,000 rpm for approximately 3 minutes, thereby preparing an asphalt-urethane composition (A-2:B-1=1:2).

The groundworks I, II, and III were coated with the prepared asphalt-urethane composition (A-2:B-1=1:2) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 5 were evaluated in the same manner as in Example 1. The results are listed in Table 3.

Example 6

Preparation of Asphalt-urethane Composition 400 parts by mass of the component (B-1) was added to 100 parts by mass of the component (A-2) to be mixed with each other at 1,000 rpm for approximately 3 minutes, thereby preparing an asphalt-urethane composition (A-2:B-1=1:4).

The groundworks I, II, and III were coated with the prepared asphalt-urethane composition (A-2:B-1=1:4) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 6 were evaluated in the same manner as in Example 1. The results are listed in Table 3.

Example 7

Preparation of Asphalt-urethane Composition 100 parts by mass of the component (B-1) was added to 100 parts by mass of the component (A-3) to be mixed with each other at 1,000 rpm for approximately 3 minutes, thereby preparing an asphalt-urethane composition (A-3:B-1=1:1).

The groundworks I, II, and III were coated with the prepared asphalt-urethane composition (A-3:B-1=1:1) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 7 were evaluated in the same manner as in Example 1. The results are listed in Table 3.

Example 8

Preparation of Asphalt-urethane Composition 200 parts by mass of the component (B-1) was added to 100 parts by mass of the component (A-3) to be mixed with each other at 1,000 rpm for approximately 3 minutes, thereby preparing an asphalt-urethane composition (A-3:B-1=1:2).

The groundworks I, II, and III were coated with the prepared asphalt-urethane composition (A-3:B-1=1:2) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 8 were evaluated in the same manner as in Example 1. The results are listed in Table 3.

Example 9

Preparation of Asphalt-urethane Composition 400 parts by mass of the component (B-1) was added to 100 parts by mass of the component (A-3) to be mixed with each other at 1,000 rpm for approximately 3 minutes, thereby preparing an asphalt-urethane composition (A-3:B-1=1:4).

The groundworks I, II, and III were coated with the prepared asphalt-urethane composition (A-3:B-1=1:4) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 9 were evaluated in the same manner as in Example 1. The results are listed in Table 3.

Example 10

Preparation of Asphalt-urethane Composition 100 parts by mass of the component (B-1) was added to 100 parts by mass of the component (A-4) to be mixed with each other at 1,000 rpm for approximately 3 minutes, thereby preparing an asphalt-urethane composition (A-4:B-1=1:1).

The groundworks I, II, and III were coated with the prepared asphalt-urethane composition (A-4:B-1=1:1) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 10 were evaluated in the same manner as in Example 1. The results are listed in Table 3.

Example 11

Preparation of Asphalt-urethane Composition 200 parts by mass of the component (B-1) was added to 100 parts by mass of the component (A-4) to be mixed with each other at 1,000 rpm for approximately 3 minutes, thereby preparing an asphalt-urethane composition (A-4:B-1=1:2).

The groundworks I, II, and III were coated with the prepared asphalt-urethane composition (A-4:B-1=1:2) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 11 were evaluated in the same manner as in Example 1. The results are listed in Table 3.

Example 12

Preparation of Asphalt-urethane Composition 400 parts by mass of the component (B-1) was added to 100 parts by mass of the component (A-4) to be mixed with each other at 1,000 rpm for approximately 3 minutes, thereby preparing an asphalt-urethane composition (A-4:B-1=1:4).

The groundworks I, II, and III were coated with the prepared asphalt-urethane composition (A-4:B-1=1:4) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 12 were evaluated in the same manner as in Example 1. The results are listed in Table 3.

Example 13

Preparation of Asphalt-urethane Composition 100 parts by mass of the component (B-1) was added to 100 parts by mass of the component (A-5) to be mixed with each other at 1,000 rpm for approximately 3 minutes, thereby preparing an asphalt-urethane composition (A-5:B-1=1:1).

The groundworks I, II, and III were coated with the prepared asphalt-urethane composition (A-5:B-1=1:1) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 13 were evaluated in the same manner as in Example 1. The results are listed in Table 3.

Example 14

Preparation of Asphalt-urethane Composition 200 parts by mass of the component (B-1) was added to 100 parts by mass of the component (A-5) to be mixed with each other at 1,000 rpm for approximately 3 minutes, thereby preparing an asphalt-urethane composition (A-5:B-1=1:2).

The groundworks I, II, and III were coated with the prepared asphalt-urethane composition (A-5:B-1=1:2) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 14 were evaluated in the same manner as in Example 1. The results are listed in Table 3.

Example 15

Preparation of Asphalt-urethane Composition 400 parts by mass of the component (B-1) was added to 100 parts by mass of the component (A-5) to be mixed with each other at 1,000 rpm for approximately 3 minutes, thereby preparing an asphalt-urethane composition (A-5:B-1=1:4).

The groundworks I, II, and III were coated with the prepared asphalt-urethane composition (A-5:B-1=1:4) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 15 were evaluated in the same manner as in Example 1. The results are listed in Table 3.

Example 16

Preparation of Asphalt-urethane Composition 100 parts by mass of the component (B-2-1) was added to 100 parts by mass of the component (A-3) to be mixed with each other at 1,000 rpm for approximately 3 minutes, thereby preparing an asphalt-urethane composition (A-3:B-2-1=1:1).

The groundworks I, II, and III were coated with the prepared asphalt-urethane composition (A-3:B-2-1=1:1) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 16 were evaluated in the same manner as in Example 1. The results are listed in Table 4.

Example 17

Preparation of Asphalt-urethane Composition 200 parts by mass of the component (B-2-2) was added to 100 parts by mass of the component (A-3) to be mixed with each other at 1,000 rpm for approximately 3 minutes, thereby preparing an asphalt-urethane composition (A-3:B-2-2=1:2).

The groundworks I, II, and III were coated with the prepared asphalt-urethane composition (A-3:B-2-2=1:2) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 17 were evaluated in the same manner as in Example 1. The results are listed in Table 4.

Example 18

Preparation of Asphalt-urethane Composition 400 parts by mass of the component (B-2-3) was added to 100 parts by mass of the component (A-3) to be mixed with each other at 1,000 rpm for approximately 3 minutes, thereby preparing an asphalt-urethane composition (A-3:B-2-3=1:4).

The groundworks I, II, and III were coated with the prepared asphalt-urethane composition (A-3:B-2-3=1:4) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 18 were evaluated in the same manner as in Example 1. The results are listed in Table 4.

Example 19

Preparation of Asphalt-urethane Composition 100 parts by mass of the component (B-3-1) was added to 100 parts by mass of the component (A-3) to be mixed with each other at 1,000 rpm for approximately 3 minutes, thereby preparing an asphalt-urethane composition (A-3:B-3-1=1:1).

The groundworks I, II, and III were coated with the prepared asphalt-urethane composition (A-3:B-3-1=1:1) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 19 were evaluated in the same manner as in Example 1. The results are listed in Table 4.

Example 20

Preparation of Asphalt-urethane Composition 200 parts by mass of the component (B-3-2) was added to 100 parts by mass of the component (A-3) to be mixed with each other at 1,000 rpm for approximately 3 minutes, thereby preparing an asphalt-urethane composition (A-3:B-3-2=1:2).

The groundworks I, II, and III were coated with the prepared asphalt-urethane composition (A-3:B-3-2=1:2) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 20 were evaluated in the same manner as in Example 1. The results are listed in Table 4.

Example 21

Preparation of Asphalt-urethane Composition 400 parts by mass of the component (B-3-3) was added to 100 parts by mass of the component (A-3) to be mixed with each other at 1,000 rpm for approximately 3 minutes, thereby preparing an asphalt-urethane composition (A-3:B-3-3=1:4).

The groundworks I, II, and III were coated with the prepared asphalt-urethane composition (A-3:B-3-3=1:4) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 21 were evaluated in the same manner as in Example 1. The results are listed in Table 4.

Example 22

Preparation of Asphalt-urethane Composition 100 parts by mass of the component (B-1) was added to 100 parts by mass of the component (A-6) to be mixed with each other at 1,000 rpm for approximately 3 minutes, thereby preparing an asphalt-urethane composition (A-6:B-1=1:1).

The groundworks I, II, and III were coated with the prepared asphalt-urethane composition (A-6:B-1=1:1) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 22 were evaluated in the same manner as in Example 1. The results are listed in Table 4.

Example 23

Preparation of Asphalt-urethane Composition 200 parts by mass of the component (B-1) was added to 100 parts by mass of the component (A-6) to be mixed with each other at 1,000 rpm for approximately 3 minutes, thereby preparing an asphalt-urethane composition (A-6:B-1=1:2).

The groundworks I, II, and III were coated with the prepared asphalt-urethane composition (A-6:B-1=1:2) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 23 were evaluated in the same manner as in Example 1. The results are listed in Table 4.

Example 24

Preparation of Asphalt-urethane Composition 400 parts by mass of the component (B-1) was added to 100 parts by mass of the component (A-6) to be mixed with each other at 1,000 rpm for approximately 3 minutes, thereby preparing an asphalt-urethane composition (A-6:B-1=1:4).

The groundworks I, II, and III were coated with the prepared asphalt-urethane composition (A-6:B-1=1:4) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 24 were evaluated in the same manner as in Example 1. The results are listed in Table 4.

Example 25

Preparation of Asphalt-urethane Composition 500 parts by mass of the component (B-4-1) was added to 100 parts by mass of the component (A-6) to be mixed with each other at 1,000 rpm for approximately 3 minutes, thereby preparing an asphalt-urethane composition (A-6:B-4-1=1:5).

The groundworks I, II, and III were coated with the prepared asphalt-urethane composition (A-6:B-4-1=1:5) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 25 were evaluated in the same manner as in Example 1. The results are listed in Table 4.

Example 26

Preparation of Asphalt-urethane Composition 800 parts by mass of the component (B-4-2) was added to 100 parts by mass of the component (A-6) to be mixed with each other at 1,000 rpm for approximately 3 minutes, thereby preparing an asphalt-urethane composition (A-6:B-4-2=1:8).

The groundworks I, II, and III were coated with the prepared asphalt-urethane composition (A-6:B-4-2=1:8) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 26 were evaluated in the same manner as in Example 1. The results are listed in Table 4.

Example 27

Preparation of Asphalt-urethane Composition 1400 parts by mass of the component (B-4-3) was added to 100 parts by mass of the component (A-6) to be mixed with each other at 1,000 rpm for approximately 3 minutes, thereby preparing an asphalt-urethane composition (A-6:B-4-3=1:14).

The groundworks I, II, and III were coated with the prepared asphalt-urethane composition (A-6:B-4-3=1:14) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 27 were evaluated in the same manner as in Example 1. The results are listed in Table 4.

Example 28

Preparation of Asphalt-urethane Composition 100 parts by mass of the component (B-1) was added to 100 parts by mass of the component (A-7) to be mixed with each other at 1,000 rpm for approximately 3 minutes, thereby preparing an asphalt-urethane composition (A-7:B-1=1:1).

The groundworks I, II, and III were coated with the prepared asphalt-urethane composition (A-7:B-1=1:1) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 28 were evaluated in the same manner as in Example 1. The results are listed in Table 4.

Example 29

Preparation of Asphalt-urethane Composition 200 parts by mass of the component (B-1) was added to 100 parts by mass of the component (A-7) to be mixed with each other at 1,000 rpm for approximately 3 minutes, thereby preparing an asphalt-urethane composition (A-7:B-1=1:2).

The groundworks I, II, and III were coated with the prepared asphalt-urethane composition (A-7:B-1=1:2) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 29 were evaluated in the same manner as in Example 1. The results are listed in Table 4.

Example 30

Preparation of Asphalt-urethane Composition 400 parts by mass of the component (B-1) was added to 100 parts by mass of the component (A-7) to be mixed with each other at 1,000 rpm for approximately 3 minutes, thereby preparing an asphalt-urethane composition (A-7:B-1=1:4).

The groundworks I, II, and III were coated with the prepared asphalt-urethane composition (A-7:B-1=1:4) by an amount of approximately 40 g respectively, and the asphalt-urethane composition was impregnated with reinforcing cloth (trade name: DAIWA TAPE S, manufactured by Direx Corporation) to be provided on the entire surface and smoothed using a caulking spatula.

Further, the cured state, the density, and the hardness (type A) of the asphalt-urethane composition of Example 30 were evaluated in the same manner as in Example 1. The results are listed in Table 4.

TABLE 3

| | Example | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Blending ratio | A-1 | 100 | 100 | 100 | 0 | 0 | 0 | 0 | 0 | 0 | 0 | 0 | 0 | 0 | 0 | 0 |
| | A-2 | 0 | 0 | 0 | 100 | 100 | 100 | 0 | 0 | 0 | 0 | 0 | 0 | 0 | 0 | 0 |
| | A-3 | 0 | 0 | 0 | 0 | 0 | 0 | 100 | 100 | 100 | 0 | 0 | 0 | 0 | 0 | 0 |
| | A-4 | 0 | 0 | 0 | 0 | 0 | 0 | 0 | 0 | 0 | 100 | 100 | 100 | 0 | 0 | 0 |
| | A-5 | 0 | 0 | 0 | 0 | 0 | 0 | 0 | 0 | 0 | 0 | 0 | 0 | 100 | 100 | 100 |
| | A-6 | 0 | 0 | 0 | 0 | 0 | 0 | 0 | 0 | 0 | 0 | 0 | 0 | 0 | 0 | 0 |
| | A-7 | 0 | 0 | 0 | 0 | 0 | 0 | 0 | 0 | 0 | 0 | 0 | 0 | 0 | 0 | 0 |
| | B-1 | 100 | 200 | 400 | 100 | 200 | 400 | 100 | 200 | 400 | 100 | 200 | 400 | 100 | 200 | 400 |
| | B-2-1 | 0 | 0 | 0 | 0 | 0 | 0 | 0 | 0 | 0 | 0 | 0 | 0 | 0 | 0 | 0 |
| | B-2-2 | 0 | 0 | 0 | 0 | 0 | 0 | 0 | 0 | 0 | 0 | 0 | 0 | 0 | 0 | 0 |
| | B-2-3 | 0 | 0 | 0 | 0 | 0 | 0 | 0 | 0 | 0 | 0 | 0 | 0 | 0 | 0 | 0 |
| | B-3-1 | 0 | 0 | 0 | 0 | 0 | 0 | 0 | 0 | 0 | 0 | 0 | 0 | 0 | 0 | 0 |
| | B-3-2 | 0 | 0 | 0 | 0 | 0 | 0 | 0 | 0 | 0 | 0 | 0 | 0 | 0 | 0 | 0 |
| | B-3-3 | 0 | 0 | 0 | 0 | 0 | 0 | 0 | 0 | 0 | 0 | 0 | 0 | 0 | 0 | 0 |
| | B-4-1 | 0 | 0 | 0 | 0 | 0 | 0 | 0 | 0 | 0 | 0 | 0 | 0 | 0 | 0 | 0 |
| | B-4-2 | 0 | 0 | 0 | 0 | 0 | 0 | 0 | 0 | 0 | 0 | 0 | 0 | 0 | 0 | 0 |
| | B-4-3 | 0 | 0 | 0 | 0 | 0 | 0 | 0 | 0 | 0 | 0 | 0 | 0 | 0 | 0 | 0 |
| | Total | 200 | 300 | 500 | 200 | 300 | 500 | 200 | 300 | 500 | 200 | 300 | 500 | 200 | 300 | 500 |
| Curing temperature (° C.) | 23 Cured state | V | V | V | V | V | V | V | V | V | V | V | V | V | V | V |
| | Density (kg/m$^3$) | 926 | 996 | 1,018 | 961 | 991 | 1,016 | 957 | 978 | 1,015 | 948 | 969 | 999 | 947 | 965 | 1,001 |
| | Hardness (type A) | 55 | 46 | 36 | 58 | 49 | 40 | 62 | 56 | 45 | 67 | 60 | 40 | 70 | 55 | 30 |
| | 60 Cured state | V | V | V | V~W | V | V | V~W | V | V | W | V~W | V | W | W | V~W |
| | Density (kg/m$^3$) | 885 | 962 | 1,019 | 843 | 915 | 1,012 | 830 | 836 | 1,004 | 709 | 833 | 987 | 727 | 819 | 888 |
| | Hardness (type A) | 50 | 46 | 35 | 54 | 43 | 35 | 59 | 51 | 42 | 47 | 46 | 47 | 49 | 48 | 53 |

TABLE 4

| | Example | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|
| Blending ratio | A-1 | 0 | 0 | 0 | 0 | 0 | 0 | 0 | 0 | 0 | 0 | 0 | 0 | 0 | 0 | 0 |
| | A-2 | 0 | 0 | 0 | 0 | 0 | 0 | 0 | 0 | 0 | 0 | 0 | 0 | 0 | 0 | 0 |
| | A-3 | 100 | 100 | 100 | 100 | 100 | 100 | 0 | 0 | 0 | 0 | 0 | 0 | 0 | 0 | 0 |
| | A-4 | 0 | 0 | 0 | 0 | 0 | 0 | 0 | 0 | 0 | 0 | 0 | 0 | 0 | 0 | 0 |
| | A-5 | 0 | 0 | 0 | 0 | 0 | 0 | 0 | 0 | 0 | 0 | 0 | 0 | 0 | 0 | 0 |
| | A-6 | 0 | 0 | 0 | 0 | 0 | 0 | 100 | 100 | 100 | 100 | 100 | 100 | 0 | 0 | 0 |
| | A-7 | 0 | 0 | 0 | 0 | 0 | 0 | 0 | 0 | 0 | 0 | 0 | 0 | 100 | 100 | 100 |
| | B-1 | 0 | 0 | 0 | 0 | 0 | 0 | 100 | 200 | 400 | 0 | 0 | 0 | 100 | 200 | 400 |
| | B-2-1 | 100 | 0 | 0 | 0 | 0 | 0 | 0 | 0 | 0 | 0 | 0 | 0 | 0 | 0 | 0 |
| | B-2-2 | 0 | 200 | 0 | 0 | 0 | 0 | 0 | 0 | 0 | 0 | 0 | 0 | 0 | 0 | 0 |
| | B-2-3 | 0 | 0 | 400 | 0 | 0 | 0 | 0 | 0 | 0 | 0 | 0 | 0 | 0 | 0 | 0 |
| | B-3-1 | 0 | 0 | 0 | 100 | 0 | 0 | 0 | 0 | 0 | 0 | 0 | 0 | 0 | 0 | 0 |
| | B-3-2 | 0 | 0 | 0 | 0 | 200 | 0 | 0 | 0 | 0 | 0 | 0 | 0 | 0 | 0 | 0 |
| | B-3-3 | 0 | 0 | 0 | 0 | 0 | 400 | 0 | 0 | 0 | 0 | 0 | 0 | 0 | 0 | 0 |
| | B-4-1 | 0 | 0 | 0 | 0 | 0 | 0 | 0 | 0 | 0 | 500 | 0 | 0 | 0 | 0 | 0 |
| | B-4-2 | 0 | 0 | 0 | 0 | 0 | 0 | 0 | 0 | 0 | 0 | 800 | 0 | 0 | 0 | 0 |
| | B-4-3 | 0 | 0 | 0 | 0 | 0 | 0 | 0 | 0 | 0 | 0 | 0 | 1,400 | 0 | 0 | 0 |
| | Total | 200 | 300 | 500 | 200 | 300 | 500 | 200 | 300 | 500 | 600 | 900 | 1,500 | 200 | 300 | 500 |
| Curing temperature (° C.) | 23 Cured state | V | V | V | V | V | V | X | Y | Z | Z | Z | Z | X | Z | Z |
| | Density (kg/m$^3$) | 891 | 949 | 1,015 | 1,006 | 1,014 | 1,019 | | | | Impossible to measure | | | | | |
| | Hardness (type A) | 60 | 52 | 42 | 65 | 55 | 42 | | | | Impossible to measure | | | | | |
| | 60 Cured state | V~W | V | V | — | — | — | — | — | — | — | — | — | — | — | — |
| | Density (kg/m$^3$) | 605 | 892 | 993 | — | — | — | — | — | — | — | — | — | — | — | — |
| | Hardness (type A) | 43 | 45 | 42 | — | — | — | — | — | — | — | — | — | — | — | — |

Because of a difference in specific gravity between the component (A) and the component (B), the density of the component (B) was higher as the blending amount of the component (B) was increased. Further, from the results of Tables 3 and 4, it was confirmed that the asphalt-urethane composition of a uniform elastomer in which the molar equivalent ratio (NCO/OH) of the component (A) was small, the state entered a cured state V as the blending amount of the component (B) was increased, the density due to the curing conditions of 23° C. and 60° C. was not changed, and foaming was suppressed was capable of forming a waterproof coating film excellent in the cured state, the density, and the hardness.

[Test for Adhesion to Top Coat Material of Heat Asphalt]

It was confirmed that asphalt which was heated and melted was adhered to the asphalt-urethane composition.

[Groundwork Plate IV]

A groundwork plate I was prepared by polishing the surface of an ISO mortar plate (100×200×thickness of 10 mm, manufactured by YUKOU Co., Ltd.) prepared in conformity with JIS R 5201 (10.4) using #150 sandpaper.

A back-up material with an adhesive which had a thickness of 3.0 mm was provided in the periphery of the groundwork plate I.

Next, 100 parts by mass of the component (B-1) was added to 100 parts by mass of the component (A-1) to be mixed with each other at 1,000 rpm for approximately 3 minutes, thereby preparing an asphalt-urethane composition (A-1:B-1=1:1). The groundwork I was coated with the prepared asphalt-urethane composition (A-1:B-1=1:1) by an amount of approximately 40 g, and a groundwork plate IV which was smoothed using a caulking spatula was prepared.

[Groundwork Plate V]

In the same manner, a back-up material with an adhesive which had a thickness of 3.0 mm was provided in the periphery of the groundwork plate I.

Next, 200 parts by mass of the component (B-1) was added to 100 parts by mass of the component (A-1) to be mixed with each other at 1,000 rpm for approximately 3 minutes, thereby preparing an asphalt-urethane composition (A-1:B-1=1:2). The groundwork I was coated with the prepared asphalt-urethane composition (A-1:B-1=1:2) by an amount of approximately 40 g, and a groundwork plate V which was smoothed using a caulking spatula was prepared.

[Groundwork Plate VI]

In the same manner, a back-up material with an adhesive which had a thickness of 3.0 mm was provided in the periphery of the groundwork plate I.

Next, 300 parts by mass of the component (B-1) was added to 100 parts by mass of the component (A-1) to be mixed with each other at 1,000 rpm for approximately 3 minutes, thereby preparing an asphalt-urethane composition (A-1:B-1=1:3). The groundwork I was coated with the prepared asphalt-urethane composition (A-1:B-1=1:3) by an amount of approximately 40 g, and a groundwork plate VI which was smoothed using a caulking spatula was prepared.

[Groundwork Plate VII]

In the same manner, a back-up material with an adhesive which had a thickness of 3.0 mm was provided in the periphery of the groundwork plate I.

Next, a urethane coating film waterproof material for a building in conformity with JIS A 6021, which is a two-component type material (trade name: Cosmic PRO12, manufactured by UFLEX CO., LTD.), was added to 100 parts by mass of the component (A-1) at a ratio of 200 parts by mass of a curing agent to 100 parts by mass of a main agent and the mixture was mixed at 1,000 rpm for approximately 3 minutes, thereby preparing a urethane coating film waterproof material for a building. The groundwork I was coated with the prepared urethane coating film waterproof material for a building by an amount of approximately 40 g, and a groundwork plate VII which was smoothed using a caulking spatula was prepared.

[Groundwork Plate VIII]

In the same manner, a back-up material with an adhesive which had a thickness of 3.0 mm was provided in the periphery of the groundwork plate I.

Next, the groundwork plate I was coated with a urethane coating film waterproof material for a building in conformity with JIS A 6021 which is a one-component type material (trade name: ZERO ONE, manufactured by UFLEX CO., LTD.), by an amount of approximately 40 g respectively with respect to 100 parts by mass of the component (A-1), and a groundwork plate VIII which was smoothed using a caulking spatula was prepared.

Specimens obtained by coating the obtained groundwork plates IV to VIII with various asphalt-urethane compositions or various urethane coating film waterproof materials for a building were cured at a temperature of 23° C. and a humidity of 50% for 7 days, a back-up material in the periphery was removed, and releasing tape with an adhesive was adhered to a portion spaced apart from an end portion of the groundwork plate II by a distance of 120 mm. Thereafter, the side surfaces and the bottom surfaces of the groundwork plates were cured using curing tape, a polyester spunbond (trade name: VOLANS 7157P, manufactured by TOYOBO CO., LTD.) was adhered to straight asphalt 60-80 (trade name: 60-80 STRAIGHT ASPHALT, manufactured by JX Nippon Oil & Energy Corporation) melted at 140° C. while the straight asphalt 60-80 flowed in the entire surface of the groundworks IV to VIII. Subsequently, the resultant was cured at a temperature of 23° C. and a humidity of 50% for one day.

Straight asphalt 60-80, a cured material of an asphalt-urethane composition, or various urethane coating film waterproof materials were cut to a width of 25 mm in the longitudinal direction up to a mortar plate in the form of a strip using a cutter and a 180 degree peeling test was performed in conformity with a peeling and adhesive strength testing method (JIS K 6854-2).

The results are listed in Table 5. Further, the kinds of top coat materials of groundwork plates are listed in Table 6.

TABLE 5

| | | Kind of groundwork plate (adherend) | | | | | | |
|---|---|---|---|---|---|---|---|---|
| | | I | II | III | IV | V | VI | VII | VIII |
| Kind of top coat material | (1) | 28.3 | 6.7 | 2.7 | — | — | — | — | — |
| | (2) | 24.4 | 15.2 | 4.0 | — | — | — | — | — |
| | (3) | 21.6 | 30.9 | 5.5 | — | — | — | — | — |
| | (4) | — | — | — | 51.6 | 52.3 | 42.5 | 4.3 | 1.0 |
| | (5) | 27.5 | 5.0 | 0.3 | 29.5 | 27.8 | 23.9 | 62.3 | 78.5 |
| | (6) | 23.9 | 1.7 | 0.2 | 31.2 | 33.6 | 28.4 | 111.3 | 95.2 |

TABLE 6

| No. | Kind of top coat material |
|---|---|
| (1) | Component (A-3):(B-1) = 1:1 |
| (2) | Component (A-3):(B-1) = 1:2 |
| (3) | Component (A-3):(B-1) = 1:3 |
| (4) | Three kinds of asphalt for building |
| (5) | PRO-12 |
| (6) | ZERO ONE |

From the results of Table 5, it is understood that top coat materials 1, 2, 3, 5, and 6 show the same adhesive strength with respect to the groundwork plate I, the top coat materials 5 and 6 of the top coat materials 1, 2, and 3 of the asphalt-urethane composition show excellent adhesive strength with respect to asphalt-based groundwork plates II and III, and the adhesive strength is enhanced as the blending amount of the top coat materials 2 and 3 and asphalt is further increased.

Further, the top coat material 4 shows high adhesive strength with respect to the groundwork plates IV, V, and VI of the asphalt-urethane composition, but is almost not adhered to the groundwork plates VII and VIII.

Further, it is confirmed that the top coat materials 5 and 6 of the groundwork plate VII and the top coat materials 5 and 6 of the groundwork plate VIII show high peeling strength due to a difference in cohesive force, but the groundwork plates IV, V, and VI of the asphalt-urethane composition show excellent adhesive strength with respect to the top coat materials 5 and 6.

Example 31

Preparation of Asphalt-urethane Composition 100 parts by mass of the component (B-1) was added to 100 parts by mass of the component (A-3) to be mixed with each other at 1,000 rpm for approximately 3 minutes, thereby preparing an asphalt-urethane composition (A-3:B-1=1:1) (C-1 listed in Table 7).

Further, the cured state, the density, and the hardness (type A) of the asphalt-urethane composition of Example 31 were measured in the same manner as those in Example 1. The results are listed in Table 8.

Example 32

Preparation of Asphalt-urethane Composition 200 parts by mass of the component (B-1) was added to 100 parts by mass of the component (A-3) to be mixed with each other at 1,000 rpm for approximately 3 minutes, thereby preparing an asphalt-urethane composition (A-3:B-1=1:2) (C-2 listed in Table 7).

Further, the cured state, the density, and the hardness (type A) of the asphalt-urethane composition of Example 32 were measured in the same manner as those in Example 1. The results are listed in Table 8.

Example 33

Preparation of Asphalt-urethane Composition 400 parts by mass of the component (B-1) was added to 100 parts by mass of the component (A-3) to be mixed with each other at 1,000 rpm for approximately 3 minutes, thereby preparing an asphalt-urethane composition (A-3:B-1=1:4) (C-3 listed in Table 7).

Further, the cured state, the density, and the hardness (type A) of the asphalt-urethane composition of Example 33 were measured in the same manner as those in Example 1. The results are listed in Table 8.

Example 34

Preparation of Asphalt-urethane Composition 100 parts by mass of the component (B-1) was added to 100 parts by mass of the component (A-3) to which Incozel 4 (manufactured by Sika Ltd.) was added to be mixed with each other at 1,000 rpm for approximately 3 minutes, thereby preparing an asphalt-urethane composition (A-3:B-1=1:1) (C-4 listed in Table 7).

Further, the cured state, the density, and the hardness (type A) of the asphalt-urethane composition of Example 34 were measured in the same manner as those in Example 1. The results are listed in Table 8.

Example 35

Preparation of Asphalt-urethane Composition 200 parts by mass of the component (B-1) was added to 100 parts by mass of the component (A-3) to which Incozel 4 (manufactured by Sika Ltd.) was added to be mixed with each other at 1,000 rpm for approximately 3 minutes, thereby preparing an asphalt-urethane composition (A-3:B-1=1:2) (C-5 listed in Table 7).

Further, the cured state, the density, and the hardness (type A) of the asphalt-urethane composition of Example 35 were measured in the same manner as those in Example 1. The results are listed in Table 8.

Example 36

Preparation of Asphalt-urethane Composition 400 parts by mass of the component (B-1) was added to 100 parts by mass of the component (A-3) to which Incozel 4 (manufactured by Sika Ltd.) was added to be mixed with each other at 1,000 rpm for approximately 3 minutes, thereby preparing an asphalt-urethane composition (A-3:B-1=1:4) (C-6 listed in Table 7).

Further, the cured state, the density, and the hardness (type A) of the asphalt-urethane composition of Example 35 were measured in the same manner as those in Example 1. The results are listed in Table 8.

TABLE 7

| Classification | Example<br>Name of raw material | 31<br>C-1 | 32<br>C-2 | 33<br>C-3 | 34<br>C-4 | 35<br>C-5 | 36<br>C-6 |
| --- | --- | --- | --- | --- | --- | --- | --- |
| Component (A-3) | R-45HT | 38.0 | 38.0 | 38.0 | 38.0 | 38.0 | 38.0 |
| | MDI-LL | 9.3 | 9.3 | 9.3 | 9.3 | 9.3 | 9.3 |
| | MDI-LK | 4.9 | 4.9 | 4.9 | 4.9 | 4.9 | 4.9 |
| | MQ(p-methoxyphenol) | 0.1 | 0.1 | 0.1 | 0.1 | 0.1 | 0.1 |
| | IRGANOX 1035 | 0.2 | 0.2 | 0.2 | 0.2 | 0.2 | 0.2 |
| | Toluene | 47.5 | 47.5 | 47.5 | 47.5 | 47.5 | 47.5 |
| | Incozel 4 | 0.0 | 0.0 | 0.0 | 8.0 | 0.0 | 0.0 |
| | Total | 100.0 | 100.0 | 100.0 | 108.0 | 108.0 | 108.0 |

TABLE 7-continued

| | Example | 31 | 32 | 33 | 34 | 35 | 36 |
|---|---|---|---|---|---|---|---|
| Component (B-1) | Straight asphalt 60-80 | 70.0 | 140 | 280 | 70.0 | 140 | 280 |
| | Toluene | 17.13 | 34.26 | 68.5 | 17.13 | 34.26 | 68.5 |
| | Xylene | 11.42 | 22.84 | 45.7 | 11.42 | 22.84 | 45.7 |
| | Formate S-9 | 0.75 | 1.5 | 3.0 | 0.75 | 1.5 | 3.0 |
| | AO-5 | 0.70 | 1.4 | 2.8 | 0.70 | 1.4 | 2.8 |
| | Total | 100.0 | 200.0 | 400.0 | 100.0 | 200.0 | 400.0 |
| Total | | 200.0 | 300.0 | 500.0 | 200.0 | 300.0 | 500.0 |

TABLE 8

| | | Example | 31 | 32 | 33 | 34 | 35 | 36 |
|---|---|---|---|---|---|---|---|---|
| Blending ratio | | C-1 | 100 | 0 | 0 | 0 | 0 | 0 |
| | | C-2 | 0 | 100 | 0 | 0 | 0 | 0 |
| | | C-3 | 0 | 0 | 100 | 0 | 0 | 0 |
| | | C-4 | 0 | 0 | 0 | 100 | 0 | 0 |
| | | C-5 | 0 | 0 | 0 | 0 | 100 | 0 |
| | | C-6 | 0 | 0 | 0 | 0 | 0 | 100 |
| | | Total | 100 | 100 | 100 | 100 | 100 | 100 |
| Curing temperature (° C.) | 23 | Cured state | V | V | V | V | V | V |
| | | Density (kg/m$^3$) | 926 | 996 | 1,018 | 960 | 998 | 1,023 |
| | | Hardness (type A) | 55 | 46 | 36 | 65 | 62 | 38 |
| | 60 | Cured state | — | — | — | V~W | V | V |
| | | Density (kg/m$^3$) | — | — | — | 783 | 919 | 1,025 |
| | | Hardness (type A) | — | — | — | 55 | 54 | 39 |

Because of a difference in specific gravity between the component (A) and the component (B), the density of the component (B) was higher as the blending amount of the component (B) was increased. Further, from the results of Table 8, it was confirmed that the asphalt-urethane composition of a uniform elastomer in which the state entered a cured state V as the blending amount of the component (B) was increased, the density due to the curing conditions of 23° C. and 60° C. was not changed, and foaming was suppressed was capable of forming a waterproof coating film excellent in the cured state, the density, and the hardness.

INDUSTRIAL APPLICABILITY

An asphalt-urethane coating film having a thickness of 0.3 mm to 2.0 mm can be obtained by performing coating with the asphalt-urethane composition of the present invention using a trowel or a spatula or coating using a roller.

Further, the asphalt-urethane composition of the present invention can be integrated with an asphalt groundwork by being directly applied to the asphalt groundwork. For this reason, an asphalt-urethane composition can be directly applied to an asphalt groundwork, has adhesion force with respect to asphalt, can allow a portion from which an asphalt waterproof layer is removed to exhibit performance of temporary waterproofing, performs adhesion of sand to the surface layer of the mineral-surfaced asphalt roofing and adjustment of irregularity, and can be integrated with a urethane waterproof layer constructed thereon.

Further, the asphalt-urethane composition of the present invention can be also bonded to the urethane coating film waterproof material to be integrated with each other. Moreover, asphalt and the asphalt-urethane composition of the present invention can be integrated with each other by laminating heated and melted asphalt on the asphalt-urethane composition of the present invention. Accordingly, durability which cannot be obtained by waterproofing exposed parking lots can be secured by coating a rooftop parking lot or the like, with the asphalt-urethane composition of the present invention, that is waterproof-processed using a urethane coating film waterproof layer and forming asphalt pavement.

Further, since the asphalt-urethane composition of the present invention does not contain any of specific chemical substances in the Occupational Safety and Health Act, an impact on workers' health handling the asphalt-urethane composition in manufacturing processes or civil engineering and construction sites is reduced.

REFERENCE SIGNS LIST

1: CONCRETE OF ROOF PORTION
2: EXPOSED ASPHALT WATERPROOF LAYER
3: ASPHALT-URETHANE COMPOSITION
4: URETHANE WATERPROOF LAYER
5: TOP COAT
11: CONCRETE OF ROOF PORTION
12: ASPHALT PRIMER
13: PARTIALLY REMAINING ASPHALT COMPOUND
14: ASPHALT-URETHANE COMPOSITION
16: TOP COAT
21: CONCRETE FLOOR SLAB OF ROAD BRIDGE
22: PRIMER
23: URETHANE WATERPROOF LAYER
24: ASPHALT-URETHANE COMPOSITION
25: ASPHALT PAVING MATERIAL

The invention claimed is:
1. An asphalt-urethane composition comprising:
  a component (A) comprising:
    a diphenylmethane diisocyanate prepolymer formed as a reaction of polyolefin polyol having two or more hydroxyl groups, polyhydric alcohol, and a monomer of diphenylmethane diisocyanate,
a monomer of diphenylmethane diisocyanate, and
a solvent a; and
a component (B) comprising asphalt, a catalyst, and a solvent b;
wherein:
a molar equivalent ratio of an isocyanate group (NCO group) of the diphenylmethane diisocyanate prepolymer to an isocyanate group (NCO group) of the monomer of diphenylmethane diisocyanate is in a range of from 1.0:1.3 to 1.0:0.7; and
the asphalt-urethane composition is formed by mixing component (A) and component (B).

2. An asphalt-urethane composition comprising a component (C) comprising:
a diphenylmethane diisocyanate prepolymer formed as a reaction of polyolefin polyol having two or more hydroxyl groups, polyhydric alcohol, and a monomer of diphenylmethane diisocyanate,
a monomer of diphenylmethane diisocyanate,
a solvent c,
asphalt, and
a catalyst;
wherein:
a molar equivalent ratio of an isocyanate group (NCO group) of the diphenylmethane diisocyanate prepolymer to an isocyanate group (NCO group) of the monomer of diphenylmethane diisocyanate is in a range of from 1.0:1.3 to 1.0:0.7.

3. The asphalt-urethane composition according to claim 1, wherein the polyolefin polyol is at least one selected from the group consisting of polybutadiene polyol, hydrogenated polybutadiene polyol, polyisoprene polyol, castor oil-based polyol, acrylic polyol, and polytetramethylene ether glycol.

4. The asphalt-urethane composition according to claim 1, wherein the polyhydric alcohol is at least one selected from the group consisting of ethylene glycol, dipropylene glycol, 1,3-propanediol, 2-methyl 1,3-propanediol, 1,4-butanediol, 3-methyl 1,5-pentanediol, 1,6-hexanediol, glycerin, and trimethylol propane.

5. The asphalt-urethane composition according to claim 1, wherein the diphenylmethane diisocyanate is at least one selected from the group consisting of 2,2'-diphenylmethane diisocyanate, 2,4'-diphenylmethane diisocyanate, and 4,4'-diphenylmethane diisocyanate.

6. The asphalt-urethane composition according to claim 5, wherein the 4,4'-diphenylmethane diisocyanate is modified diphenylmethane diisocyanate in a liquid state at room temperature at which a part of an isocyanate group is carbondiimide and/or uretonimine-modified.

7. The asphalt-urethane composition according to claim 1, wherein the asphalt is natural asphalt, straight asphalt, blown asphalt, or modified asphalt.

8. The asphalt-urethane composition according to claim 2, wherein the polyolefin polyol is at least one selected from the group consisting of polybutadiene polyol, hydrogenated polybutadiene polyol, polyisoprene polyol, castor oil-based polyol, acrylic polyol, and polytetramethylene ether glycol.

9. The asphalt-urethane composition according to claim 8, wherein the polyhydric alcohol is at least one selected from the group consisting of ethylene glycol, dipropylene glycol, 1,3-propanediol, 2-methyl 1,3-propanediol, 1,4-butanediol, 3-methyl 1,5-pentanediol, 1,6-hexanediol, glycerin, and trimethylol propane.

10. The asphalt-urethane composition according to claim 9, wherein the diphenylmethane diisocyanate is at least one selected from the group consisting of 2,2'-diphenylmethane diisocyanate, 2,4'-diphenylmethane diisocyanate, and 4,4'-diphenylmethane diisocyanate.

11. The asphalt-urethane composition according to claim 10, wherein the 4,4'-diphenylmethane diisocyanate is modified diphenylmethane diisocyanate in a liquid state at room temperature at which a part of an isocyanate group is carbondiimide and/or uretonimine-modified.

12. The asphalt-urethane composition according to claim 11, wherein the asphalt is natural asphalt, straight asphalt, blown asphalt, or modified asphalt.

13. The asphalt-urethane composition according to claim 1, wherein a molar equivalent ratio of an isocyanate group (NCO group) of the monomer of diphenylmethane diisocyanate to a hydroxyl group (OH group) of the polyolefin polyol in the reaction forming the diphenylmethane diisocyanate prepolymer is in a range of from 1.8 to 4.0.

14. The asphalt-urethane composition according to claim 1, wherein the solvent a is selected from the group consisting of toluene, xylene, methyl acetate, ethyl acetate, butyl acetate, and mineral spirit.

15. The asphalt-urethane composition according to claim 1, wherein a blending ratio of the diphenylmethane diisocyanate prepolymer to the solvent a is in a range of from 75:25 to 35:65.

16. The asphalt-urethane composition according to claim 15, wherein the blending ratio of the diphenylmethane diisocyanate prepolymer to the solvent a is in a range of from 60:40 to 40:60.

17. The asphalt-urethane composition according to claim 1, wherein the component (A) further comprises a latent curing agent selected from the group consisting of aldimine and oxazolidine.

18. The asphalt-urethane composition according to claim 2, wherein a molar equivalent ratio of an isocyanate group (NCO group) of the monomer of diphenylmethane diisocyanate to a hydroxyl group (OH group) of the polyolefin polyol in the reaction forming the diphenylmethane diisocyanate prepolymer is in a range of from 1.8 to 4.0.

19. The asphalt-urethane composition according to claim 2, wherein the solvent c is selected from the group consisting of toluene, xylene, methyl acetate, ethyl acetate, butyl acetate, and mineral spirit.

20. The asphalt-urethane composition according to claim 2, further comprising a latent curing agent selected from the group consisting of aldimine and oxazolidine.

* * * * *